No. 657,832. Patented Sept. 11, 1900.
R. B. PRICE.
VEHICLE TIRE.
(Application filed July 7, 1899.)
(No Model.)

Witnesses:
E. F. Wilson.
Wm. B. Snowhook.

Inventor:
Raymond B. Price
By Rudolph —— 
Atty.

UNITED STATES PATENT OFFICE.

RAYMOND B. PRICE, OF CAMBRIDGE, MASSACHUSETTS, ASSIGNOR TO THE CALUMET TIRE RUBBER COMPANY, OF ILLINOIS.

VEHICLE-TIRE.

SPECIFICATION forming part of Letters Patent No. 657,832, dated September 11, 1900.

Application filed July 7, 1899. Serial No. 723,096. (No model.)

*To all whom it may concern:*

Be it known that I, RAYMOND B. PRICE, a citizen of the United States, residing at Cambridge, in the county of Middlesex and State of Massachusetts, have invented certain new and useful Improvements in Vehicle-Tires; and I do hereby declare the following to be a full, clear, and exact description of the invention, such as will enable others skilled in the art to which it appertains to make and use the same.

My invention relates to a novel construction in a rubber tire for vehicles, the object being to provide a tire of simple construction which can be readily mounted in a rim and held against removal, besides being cheap, durable, and possessing the requisite elasticity; and it consists in the features of construction and combinations of parts hereinafter fully described and claimed.

Figure 2:
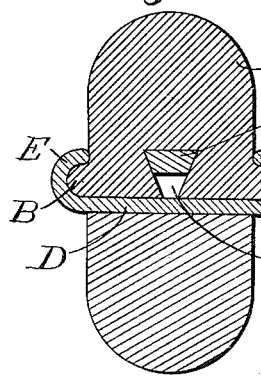
Figure 1:
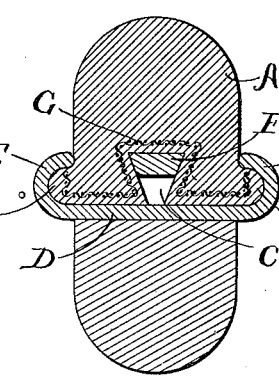
Figure 3:
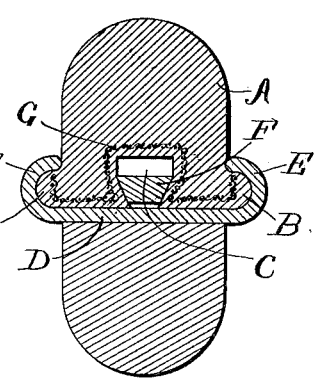
Figure 4:
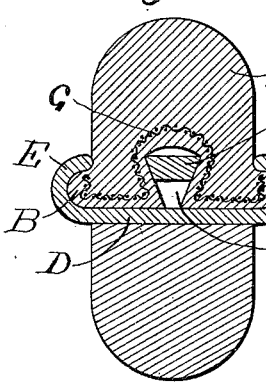
Figure 5:
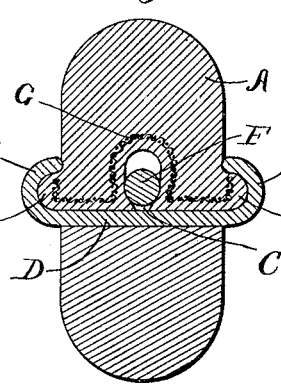
Figure 6:
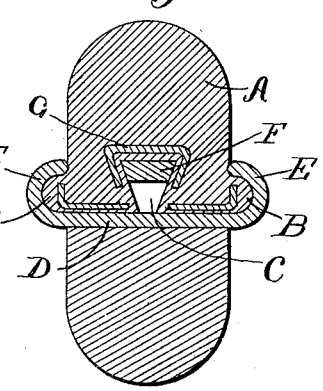
Figure 7:
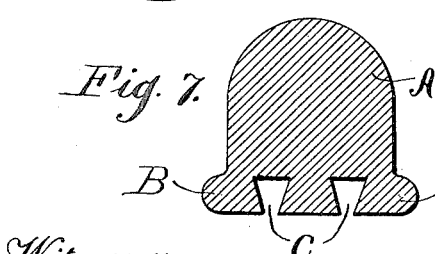
Figure 8:
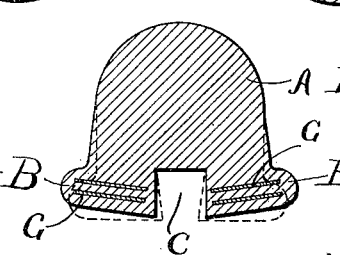

In the accompanying drawings, illustrating my invention, Figure 1 is a transverse section of a tire constructed in accordance with my invention. Fig. 2 is a similar section showing the tire without the intermolded stiffening. Fig. 3 is a section similar to Fig. 1, showing the securing-band drawn to wedge the rubber tire into the rim. Figs. 4 and 5 are sectional views showing slight modifications in construction of the tire. Fig. 6 is a sectional view showing an intermolded stiffening-strip other than wire-cloth. Fig. 7 is a sectional view showing two dovetail grooves therein. Fig. 8 is a sectional view showing one form in which the rubber tire may be formed.

The main feature of my present invention consists in providing a dovetail groove or channel in the base of the tire in which a wedge-shaped band is adapted to be received, which when contracted around the rim is adapted to spread the base of the tire, thereby firmly forcing the same into the rim and holding same against springing out.

Another feature of my invention consists in providing means for stiffening the base portion of the tire around said groove or channel, whereby the tendency to spring out of the rim is very largely overcome and the life of the tire increased.

Referring now to said drawings, A indicates a rubber tire provided on each side of its base portion with annular flanges B and in the middle portion of said base with an annular groove or channel C, of dovetail shape in cross-section. Said tire A is adapted to fit within a rim D, adapted to receive the base portion, and which is provided on its edges with annular overhanging flanges E, forming annular grooves adapted to receive said flanges B of said tire A. A metal band F, of greater width than the mouth of the groove or channel C, is adapted to be inserted into the latter and normally lie and fit snugly within the widest part of same and be held firmly in a definite position before said tire A is mounted in said rim D. After said tire has been inserted in said rim, which is easily effected by pressing the two portions of the base together to contract said base and after inserting the thus contracted base into said rim, releasing the pressure, said band F is contracted by drawing its ends together, thereby causing it to force its way annularly toward the mouth of said groove or channel C and obviously forcing the portion of said tire on each side of said groove or channel outwardly and compressing said base between said groove or channel C and the flanges of said rim D. In order to stiffen said tire at its base and effectually prevent same from springing out of the rim, I have introduced an annular intermolded stiffening-strip G in said base, which follows the contour thereof, being arched at its middle portion to surround the groove or channel C and provided on its edges with annular flanges adapted to be located within the flanges B of said tire A. The said flanges of said stiffening-strip so stiffen said flanges B as to prevent same from buckling or making sharp bends, which is obviously desirable. Said strip G likewise laterally stiffens the flat portion of said base on each side of said groove or channel C against compression or lateral bending, so that when said band F is drawn tight it will be impossible to remove the tire from the rim. Said intermolded stiffening-strip G consists, preferably, of wire-cloth consisting of or plated with a metal—such, for example, as copper, brass, silver, &c.—which will be acted upon by the sulfur in the rubber to produce adhesion between same and the rubber, whereby the rubber and the stiffening-strip form a practically-integral mass, thus avoiding all relative chafing and cutting.

By my means of securing the tire on the rim the compression in the tire due to the manner of fastening same as distinguished from compression of the tread to resist cutting (effected by vulcanizing same on a smaller diameter than that of the wheel upon which said tire is intended to be mounted) is limited entirely to the lower base portion, thus leaving a greater sectional area of the tread portion resilient and elastic than in the wire-fastened tires at present generally used. The hollow core in said tire remaining after the stiffening-strip has been drawn tight also gives a cushion effect to the tire and adds to its resiliency, thus making it softer and enabling it to withstand lateral strains and mount obstructions presented at an acute angle to the direction of motion. By thus making the tire softer and more elastic the vibration occasioned in traveling over a rough road is absorbed by the tire to a far greater extent than with the tires at present in use, thus prolonging the life of the vehicle and enhancing the comfort of the occupants. By arching the stiffening-strip to surround the groove or channel C the tread is prevented from compressing radially to an undue extent, while at the same time such radial pressure is transmitted laterally toward the flanges of the tire, which is also desirable, as materially increasing the resiliency. The insertion of the metallic stiffening-strip is also advantageous, inasmuch as the rubber adjacent same is vulcanized to a greater degree than the balance of the tire, thus making the base of said tire stiffer than the tread. Said groove or channel C can be variously shaped in its widest portion, its outermost side or bottom being either flat or rounded. A heavy wire may also be substituted for the band F, it being essential only that such wire should be of greater diameter than the width of the mouth of said groove or channel C. The stiffening-strip G may also consist of material other than wire-cloth, as shown in Fig. 6, duck or similar material being substituted therefor and inserted in any suitable manner, the manner of insertion being dependent upon the material employed.

In Fig. 7 I have illustrated a tire provided with two dovetail grooves or channels C, which may be desirable particularly for tires for heavy vehicles. This number may obviously be increased, if so desired, without departing from the spirit of my invention.

In Fig. 8 I have illustrated the tire as it may appear before its insertion in the rim, the base being spread and the groove or channel C of rectangular form, which when said base is contracted, as shown in dotted lines, becomes dovetail shaped. In forming the tire this would be preferable, as the tire itself would be given greater spring, thus more firmly gripping the rim. The groove or channel C may, however, be formed in any manner that the manufacturer may deem most practicable and I do not wish to be limited to any particular method of forming same.

I claim as my invention—

1. In a solid vehicle-tire, the combination with a rim having overhanging annular flanges adapted to form an annular channel contracted at its peripheral portion, of a rubber tire adapted to be inserted in said rim and provided in its base with an annular groove or channel narrower at its mouth than in the body of said tire, and an annular band of greater width than the mouth portion of said groove or channel adapted to be inserted in the latter and fit snugly within the wide portion of same whereby it is held in position while said tire is being sprung into said rim and adapted to spread the base portion of said tire when drawn radially inwardly, whereby said tire is firmly wedged into said rim and secured.

2. In a solid vehicle-tire, the combination with a rim provided with annular flanges adapted to form an annular channel contracted at its peripheral portion, of a tire adapted to be mounted in said rim, said tire being normally of greater width at its base than the peripheral portion of said rim, and provided at its middle portion with an annular groove or channel contracted at its mouth, and an annular band of greater thickness than the mouth of said annular groove or channel adapted to enter the latter and fit snugly within the wide portion of same whereby it is firmly held in position while the tire is being sprung into said rim, and adapted to spread the base of said tire when drawn radially inwardly, whereby said tire is firmly wedged in said rim and secured.

3. In a solid vehicle-tire, the combination with a rim provided with annular overhanging flanges forming annular recesses, of a rubber tire adapted to be mounted on said rim and provided with annular flanges adapted to fit within said annular recesses of said rim, and means for securing said tire comprising an annular groove or channel therein adapted to be contracted at its mouth portion, and a key-piece in said groove or channel of greater width than the mouth of the latter, and adapted to fit snugly within the wide portion of said groove, whereby it is firmly held in position while said tire is being sprung into said rim, and adapted to be drawn radially toward said rim to spread the base portion of said tire and wedge same into said rim.

4. In a solid vehicle-tire, the combination with a rim provided with annular flanges adapted to form a channel contracted at its peripheral portion, of a rubber tire adapted to be mounted in said rim and provided in its base portion with an annular groove adapted to be contracted at its mouth portion, and means for securing said tire within said rim, comprising devices within said groove of greater width than the mouth of the latter and adapted to fit snugly within the wide portion thereof, whereby said devices are firmly held in place while said tire is being sprung into said rim, said devices being adapted to be drawn toward said mouth to spread said base portion of said tire to wedge same firmly within said rim.

5. In a solid vehicle-tire, the combination with a rim provided with annular overhanging flanges adapted to form annular recesses at the sides of said rim, of a rubber tire provided with annular flanges at its base adapted to enter said annular recesses in said rim, an annular groove in the middle portion of said base adapted to be contracted at its mouth portion, and means for securing said tire within said rim comprising devices mounted in said groove of greater width than the mouth portion of the latter and adapted to fit snugly within the wide portion of said groove, whereby said devices are firmly held in position while said tire is being sprung into said rim, said devices being adapted to be drawn toward said mouth to spread said tire at its base and force said flanges firmly within the recesses of said rim.

6. In a solid vehicle-tire, the combination with a rim provided with annular overhanging flanges adapted to form annular recesses at the sides of said rim, of a rubber tire provided with annular flanges at its base adapted to enter said annular recesses in said rim, an annular groove in the middle portion of said base adapted to be contracted at its mouth portion, and means for securing said tire within said rim comprising devices mounted in said groove of greater width than the mouth portion of the latter and adapted to fit snugly within the wide portion of said groove, whereby said devices are firmly held in position while said tire is being sprung into said rim, said devices being adapted to be drawn toward said mouth to spread said tire at its base and force said flanges firmly within the recesses of said rim, and an intermolded stiffening-strip in said tire extending laterally on each side of said groove and into said flanges, adapted to prevent lateral bending or buckling of said base portion of said tire.

7. In a solid vehicle-tire, the combination with a rim provided with annular flanges adapted to form an annular channel contracted at its peripheral portion, of a rubber tire of greater width at its base than said channel adapted to be mounted in said rim, an annular groove in the middle portion of said base adapted to be contracted at its mouth portion to decrease the width of said base to enable the latter to enter said channel, and a key-piece in said groove of greater width than the mouth portion of said groove when contracted, and adapted to fit snugly within the wide portion of said groove, whereby it is firmly held in position while said tire is being sprung into said rim, said key-piece being adapted to be drawn toward said mouth portion to spread said base and wedge same firmly between the flanges of said rim.

8. In a solid vehicle-tire, the combination with a rim having flanges adapted to form an annular channel contracted at its mouth, of a tire adapted to be mounted in said rim, and means for securing said tire within said rim comprising devices contained in said tire adjacent the base thereof and adapted to be engaged by the sides of the containing-recess to hold same in place, and when moved radially inwardly to spread the base of said tire and wedge same firmly in said rim.

9. In a solid vehicle-tire, the combination with a rim having annular flanges adapted to form an annular channel contracted at its mouth, of a tire adapted to be mounted in said rim and engage said flanges at its base portion, an annular groove or recess in the base portion of said tire contracted at its mouth portion, lateral intermolded stiffening-strips in said base on each side of said annular groove or channel, and a key-piece in said groove or channel of greater width than the mouth portion thereof adapted to spread said base across said stiffened portion when forced radially inwardly to lock said tire within said rim.

10. In a solid vehicle-tire, the combination with a rim having annular flanges adapted to form an annular channel contracted at its mouth, of a tire adapted to be mounted in said rim and engage said flanges at its base portion, an annular groove or recess in the base portion of said tire contracted at its mouth portion, an intermolded stiffening-strip in said base portion arched over said groove or channel and extending laterally from each side thereof, and a key-piece in said groove or channel of greater width than the mouth portion thereof adapted to be forced radially inwardly to spread said base and lock said tire within said rim.

11. In a solid vehicle-tire, the combination with a rim provided with annular overhanging flanges adapted to form annular recesses, of a rubber tire provided at its base with annular flanges adapted to fit within the annular recesses of said rim, a dovetail-shaped annular groove or channel in the middle portion of the base of said tire, an intermolded stiffening material following the contour of the base of said tire and extending into the flanges thereof, and means for locking said tire in said rim comprising an annular key of greater width than the narrow portion of said groove or channel mounted within said groove and adapted to be forced into said narrow portion thereof to spread said base portion of said tire.

12. A solid vehicle-tire, comprising a rubber tire provided at its base with annular flanges, an annular groove or channel in the middle portion of said base contracted at its mouth, an annular key in said groove or channel of greater width than the mouth thereof adapted to spread said base when forced toward said mouth, a foraminated metallic stiffening-strip intermolded in said base and following the contour thereof, and a rim adapted to receive said tire.

13. A solid vehicle-tire, comprising a rubber tire provided at its base with annular flanges, an annular groove or channel in the middle portion of said base contracted at its mouth, an annular key in said groove or channel of greater width than the mouth thereof adapted to spread said base when forced toward said mouth, a foraminated metallic stiffening-strip intermolded in said base and following the contour thereof and provided with annular flanges adapted to extend into the flanges of said tire, and a rim adapted to receive said tire.

14. A solid vehicle-tire, comprising a rubber tire provided at its base with annular flanges, an annular groove or channel in the middle portion of said base contracted at its mouth, an annular key in said groove or channel of greater width than the mouth thereof adapted to spread said base when forced toward said mouth, a foraminated metallic stiffening-strip intermolded in said base and following the contour thereof, and provided with annular flanges adapted to extend into the flanges of said tire, and a rim adapted to receive said tire, said rim being provided with annular recesses adapted to receive the flanges of said tire.

In testimony whereof I affix my signature in presence of two witnesses.

RAYMOND B. PRICE.

Witnesses:
RUDOLPH WM. LOTZ,
WM. B. SNOWHOOK.